United States Patent
Yoshimura et al.

(10) Patent No.: US 10,738,142 B2
(45) Date of Patent: Aug. 11, 2020

(54) SOLUBLE MATERIAL FOR THREE-DIMENSIONAL MOLDING

(71) Applicant: KAO CORPORATION, Tokyo (JP)

(72) Inventors: Tadanori Yoshimura, Wakayama (JP); Takuma Kimura, Sumida (JP); Jouji Hirai, Wakayama (JP)

(73) Assignee: KAO CORPORATION, Tokyo (JP)

( * ) Notice: Subject to any disclaimer, the term of this patent is extended or adjusted under 35 U.S.C. 154(b) by 341 days.

(21) Appl. No.: 15/518,812

(22) PCT Filed: Oct. 2, 2015

(86) PCT No.: PCT/JP2015/078113
§ 371 (c)(1),
(2) Date: Apr. 13, 2017

(87) PCT Pub. No.: WO2016/059987
PCT Pub. Date: Apr. 21, 2016

(65) Prior Publication Data
US 2017/0240675 A1    Aug. 24, 2017

(30) Foreign Application Priority Data

Oct. 14, 2014  (JP) .................. 2014-210080
Dec. 10, 2014  (JP) .................. 2014-250054

(51) Int. Cl.
| | |
|---|---|
| *B33Y 10/00* | (2015.01) |
| *C08F 220/18* | (2006.01) |
| *C08F 220/06* | (2006.01) |
| *B33Y 70/00* | (2020.01) |
| *C08F 222/02* | (2006.01) |
| *C08F 220/14* | (2006.01) |
| *C08F 212/08* | (2006.01) |
| *C08K 5/11* | (2006.01) |
| *D01F 6/36* | (2006.01) |
| *D01F 6/42* | (2006.01) |
| *B29C 64/106* | (2017.01) |
| *B29K 55/02* | (2006.01) |
| *B29K 67/00* | (2006.01) |
| *B29K 105/00* | (2006.01) |

(52) U.S. Cl.
CPC ............ *C08F 220/18* (2013.01); *B33Y 10/00* (2014.12); *B33Y 70/00* (2014.12); *C08F 212/08* (2013.01); *C08F 220/06* (2013.01); *C08F 220/14* (2013.01); *C08F 222/02* (2013.01); *C08K 5/11* (2013.01); *D01F 6/36* (2013.01); *D01F 6/42* (2013.01); *B29C 64/106* (2017.08); *B29K 2055/02* (2013.01); *B29K 2067/046* (2013.01); *B29K 2105/0085* (2013.01); *B29K 2995/0092* (2013.01); *B29K 2995/0093* (2013.01); *C08F 220/1804* (2020.02); *D10B 2401/024* (2013.01)

(58) Field of Classification Search
CPC .... C08F 220/18; C08F 220/14; C08F 222/02; C08F 212/08; C08F 220/06; C08F 2220/1825; D01F 6/42; D01F 6/36; C08K 5/11; B33Y 10/00; B33Y 70/00; B29C 64/106; D10B 2401/024; B29K 2995/0093; B29K 2995/0092; B29K 2105/0085; B29K 2067/046; B29K 2055/02

See application file for complete search history.

(56) References Cited

U.S. PATENT DOCUMENTS

| | | | |
|---|---|---|---|
| 3,390,034 A * | 6/1968 | Hull ...................... | D04H 11/00 156/72 |
| 6,790,403 B1 * | 9/2004 | Priedeman, Jr. ........ | B29C 41/36 264/442 |
| 7,332,537 B2 | 2/2008 | Bredt et al. | |
| 7,910,041 B1 | 3/2011 | Priedeman, Jr. | |
| 8,246,888 B2 * | 8/2012 | Hopkins ................. | C08L 25/08 264/308 |
| 2003/0107158 A1 | 6/2003 | Levy | |
| 2008/0194762 A1 | 8/2008 | Sugasaki | |

(Continued)

FOREIGN PATENT DOCUMENTS

| | | |
|---|---|---|
| CN | 102186918 A | 9/2011 |
| EP | 2514775 A1 | 10/2012 |

(Continued)

OTHER PUBLICATIONS

Beck-Candanedo et al., "Effect of Reaction Conditions on the Properties and Behavior of Wood Cellulose Nanocrystal Suspensions," Biomacromolecules, vol. 6, No. 2, 2005, pp. 1048-1054 (7 pages).

(Continued)

*Primary Examiner* — Nahida Sultana
(74) *Attorney, Agent, or Firm* — Birch, Stewart, Kolasch & Birch, LLP

(57) ABSTRACT

The soluble material for three-dimensional modeling that is used as a material of a support material that supports a three-dimensional object when manufacturing the three-dimensional object with a fused deposition modeling type 3D printer. The soluble material for three-dimensional modeling includes at least one copolymer comprising a specific hydrophilic monomer unit and a specific hydrophobic monomer unit. The present invention has a glass transition temperature suitable for the FDM system, has a high dissolution rate in an alkaline aqueous solution, can be quickly removed from a precursor of a three-dimensional object, and makes it possible to suppress or reduce damage to a three-dimensional object.

14 Claims, No Drawings

(56) References Cited

U.S. PATENT DOCUMENTS

| | | | |
|---|---|---|---|
| 2009/0244703 A1* | 10/2009 | Asakura | B29C 41/28 |
| | | | 359/485.01 |
| 2010/0096072 A1* | 4/2010 | Hopkins | C08L 25/08 |
| | | | 156/155 |
| 2010/0136691 A1 | 6/2010 | Bertholdt | |
| 2010/0264566 A1 | 10/2010 | Moore et al. | |
| 2010/0285295 A1 | 11/2010 | Wang et al. | |
| 2012/0097194 A1* | 4/2012 | McDaniel | C09D 7/65 |
| | | | 134/26 |
| 2013/0171439 A1 | 7/2013 | Shoseyov et al. | |
| 2013/0175218 A1 | 7/2013 | Chu et al. | |
| 2013/0225779 A1 | 8/2013 | Ruggieri et al. | |
| 2013/0251890 A1 | 9/2013 | Lee et al. | |
| 2015/0017432 A1 | 1/2015 | Shoseyov et al. | |
| 2015/0291752 A1 | 10/2015 | Sumnicht et al. | |
| 2015/0368441 A1 | 12/2015 | Retsina et al. | |
| 2016/0089720 A1 | 3/2016 | Kamakura et al. | |
| 2016/0194462 A1 | 7/2016 | Wada et al. | |
| 2016/0208087 A1 | 7/2016 | Virtanen et al. | |
| 2016/0312022 A1* | 10/2016 | Niessner | B33Y 10/00 |
| 2017/0100817 A1* | 4/2017 | Ganapathiappan | B24B 37/24 |
| 2018/0065092 A1 | 3/2018 | Mihranyan | |
| 2018/0222111 A1* | 8/2018 | Bayer | C08L 1/28 |
| 2018/0244890 A1* | 8/2018 | Hikmet | B29C 64/106 |
| 2019/0375149 A1* | 12/2019 | Limem | A61L 31/06 |
| 2020/0070404 A1* | 3/2020 | Bruggeman | B29C 64/393 |
| 2020/0122386 A1* | 4/2020 | Hikmet | B29C 64/118 |

FOREIGN PATENT DOCUMENTS

| | | |
|---|---|---|
| EP | 3208074 A1 | 8/2017 |
| JP | 2005-531439 A | 10/2005 |
| JP | 2008-507619 A | 3/2008 |
| JP | 2012-509777 A | 4/2012 |
| JP | 2014-511933 A | 5/2014 |
| WO | WO 2004/003823 A1 | 1/2004 |
| WO | WO 2006/020279 A2 | 2/2006 |
| WO | WO 2010/045147 A2 | 4/2010 |
| WO | WO 2012/143182 A1 | 10/2012 |

OTHER PUBLICATIONS

Cataldi et al., "Polymer composite with micro- and nanocellulose for artwork protection and restoration", ECCM16—16th European Conference on Composite Materials, Jun. 22-26, 2014, Seville, Spain, pp. 1-8 (8 pages).

Saito et al., "Cellulose Nanofibers Prepared by TEMPO-Mediated Oxidation of Native Cellulose", Biomacromolecules, vol. 8, No. 8, 2007, pp. 2485-2491 (7 pages).

European Office Action issued in corresponding European Application No. 15850888.7 and dated Apr. 10, 2018.

Chinese Office Action and Search Report for Chinese Application No. 201580002830.0, dated May 9, 2017.

International Preliminary Report on Patentability and English translation of the Written Opinion of the International Searching Authority (Forms PCT/IB/338, PCT/IB/373 and PCT/ISA/237) for International Application No. PCT/JP2015/078112, dated Apr. 27, 2017.

International Preliminary Report on Patentability and English translation of the Written Opinion of the International Searching Authority (Forms PCT/IB/338, PCT/IB/373 and PCT/ISA/237) for International Application No. PCT/JP2015/078113, dated Apr. 27, 2017.

International Search Report and Written Opinion of the International Searching Authority (Forms PCT/ISA/210 and PCT/ISA/237) for International Application No. PCT/JP2015/078112, dated Dec. 22, 2015.

Shofner et al., "Nanofiber-Reinforced Polymers Prepared by Fused Deposition Modeling," Journal of Applied Polymer Science, vol. 89, Sep. 12, 2003, pp. 3081-3090.

Written Opinion of the International Searching Authority (Form PCT/ISA/237) for International Application No. PCT/JP2015/078113, dated Dec. 22, 2015, with an English translation.

Extended European Search Report, dated Mar. 9, 2018, for European Application No. 15850615.4.

International Search Report for PCT/JP2015/078113 dated Dec. 22, 2015.

European Patent Office Communication and extended search report issued in the European Patent Application No. 19212850.2 dated Feb. 21, 2020.

Benhamou et al., "Control of size and viscoelastic properties of nanofibrillated cellulose from palm tree by varying the TEMPO-mediated oxidation time," Carbohydrate Polymers, 99, 2014 (published online Aug. 20, 2013), pp. 74-83.

Polymer Processing, "Poly(vinyl alcohol)", 2001, http://www.polymerprocessing.com/polymers/PVOH.html, pp. 1-2.

* cited by examiner

SOLUBLE MATERIAL FOR THREE-DIMENSIONAL MOLDING

TECHNICAL FIELD

The present invention relates to a soluble material for three-dimensional modeling.

BACKGROUND ART

The present invention relates to a soluble material for three-dimensional modeling that is used as a material of a support material that supports a three-dimensional object when manufacturing the three-dimensional object with a 3D printer, especially a fused deposition modeling type 3D printer.

The 3D printer is one type of rapid prototyping, and it is a three-dimensional printer for modeling a three-dimensional object based on 3D data such as 3D CAD and 3D CG. Systems of 3D printing have been known, such as a fused deposition modeling system (hereinafter referred to as an FDM system), an inkjet ultraviolet curing system, an stereolithography system, and a selective laser sintering system. Among these systems, the FDM system is a modeling system of heat-melting, extruding, and laminating polymer filaments to obtain a three-dimensional object, and the FDM system does not use a reaction of the material unlike other systems. Accordingly, a 3D printer of an FDM system is small and inexpensive, and has become popular in recent years as an apparatus with less post-processing. In order to model a three-dimensional object having a more complex shape in a FDM system, a modeling material constituting the three-dimensional object and a support material for supporting a three-dimensional structure of the modeling material are laminated to obtain a precursor of the three-dimensional object, and then the support material is removed from the precursor of the three-dimensional object to obtain the target three-dimensional object.

An example of the method of removing the support material from the precursor of the three-dimensional object is a method of using a methacrylic acid copolymer as the support material and soaking the precursor of the three-dimensional object in an alkaline aqueous solution to remove the support material (for example, JP-T-2008-507619 and JP-T-2012-509777). The method utilizes that carboxylic acid in the methacrylic acid copolymer is neutralized by an alkali and dissolved in an alkaline aqueous solution.

SUMMARY OF THE INVENTION

The soluble material for three-dimensional modeling of the present invention is a soluble material for three-dimensional modeling that is used as a material of a support material that supports a three-dimensional object when manufacturing the three-dimensional object with a fused deposition modeling type 3D printer. The soluble material contains at least one copolymer selected from the group consisting of the following (I) to (III):

(I) a copolymer having at least one monomer unit selected from the group consisting of a hydrophilic monomer unit represented by the following Formula (1) and hydrophobic monomer units represented by the following Formulae (4) to (6), and having a content of the hydrophilic monomer unit of 20% by mass to 80% by mass;

(II) a copolymer having at least one monomer unit selected from the group consisting of a hydrophilic monomer unit represented by the following Formula (2) and a hydrophobic monomer unit represented by the following Formula (7), and having a content of the hydrophilic monomer unit of 20% by mass to 80% by mass; and (III) a copolymer having a hydrophilic monomer unit represented by the following Formula (3) and a hydrophobic monomer unit represented by the following Formula (8), and having a content of the hydrophilic monomer unit of 20% by mass to 80% by mass.

[Formula 1]

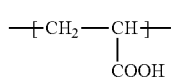

(1)

[Formula 2]

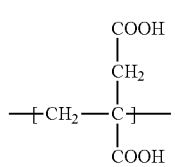

(2)

[Formula 3]

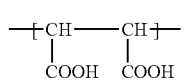

(3)

[Formula 4]

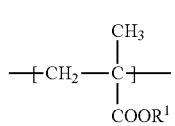

(4)

(wherein $R^1$ represents a straight chain alkyl group or a branched alkyl group each having 1 to 8 carbon atoms)

[Formula 5]

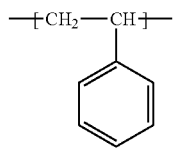

(5)

[Formula 6]

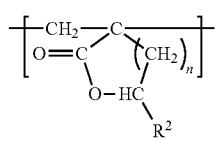

(6)

(wherein n is 1 to 3, and $R^2$ represents a hydrogen atom or a methyl group)

[Formula 7]

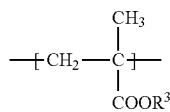
(7)

(wherein $R^3$ represents an alkyl group having 1 or 2 carbon atoms)

[Formula 8]

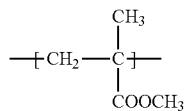
(8)

The method for manufacturing a three-dimensional object of the present invention is a method for manufacturing a three-dimensional object by fused deposition modeling, including a step of obtaining a precursor of a three-dimensional object containing the three-dimensional object and a support material, and a support material removing step of making the precursor of the three-dimensional object contact an alkaline aqueous solution to remove the support material. The material of the support material is the soluble material for three-dimensional modeling.

The support material of the present invention is a support material that supports a three-dimensional object when manufacturing the three-dimensional object by a fused deposition modeling type 3D printer, and contains at least one copolymer selected from the group consisting of the following (I) to (III):

(I) a copolymer having at least one monomer unit selected from the group consisting of a hydrophilic monomer unit represented by the following Formula (1) and hydrophobic monomer units represented by the following Formulae (4) to (6), and having a content of the hydrophilic monomer unit of 20% by mass to 80% by mass;

(II) a copolymer having at least one monomer unit selected from the group consisting of a hydrophilic monomer unit represented by the following Formula (2) and a hydrophobic monomer unit represented by the following Formula (7), and having a content of the hydrophilic monomer unit of 20% by mass to 80% by mass; and (III) a copolymer having a hydrophilic monomer unit represented by the following Formula (3) and a hydrophobic monomer unit represented by the following Formula (8), and having a content of the hydrophilic monomer unit of 20% by mass to 80% by mass.

[Formula 9]

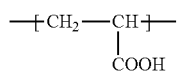
(1)

[Formula 10]

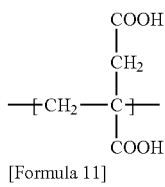
(2)

[Formula 11]

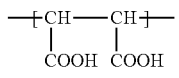
(3)

[Formula 12]

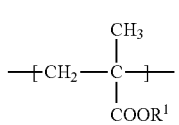
(4)

(wherein $R^1$ represents a straight chain alkyl group or a branched alkyl group each having 1 to 8 carbon atoms)

[Formula 13]

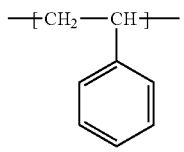
(5)

[Formula 14]

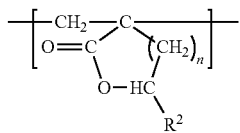
(6)

(wherein n is 1 to 3, and $R^2$ represents a hydrogen atom or a methyl group)

[Formula 15]

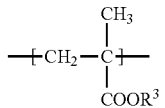
(7)

(wherein $R^3$ represents an alkyl group having 1 or 2 carbon atoms)

[Formula 16]

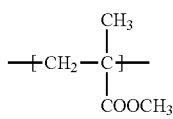
(8)

DETAILED DESCRIPTION OF THE INVENTION

Because methacrylic acid copolymers disclosed in JP-T-2008-507619 and JP-T-2012-509777 have a low dissolution rate in an alkaline aqueous solution, it is necessary to soak a precursor of the three-dimensional object in the alkaline aqueous solution for a long period of time when the methacrylic acid copolymer is used as the support material, and removal of the support material is cumbersome. If the precursor of the three-dimensional object is soaked in an alkaline aqueous solution for a long period of time, the three-dimensional object in the precursor tends to be corroded by alkalis. Accordingly, the application of a polyester resin having low resistance to alkalis, such as polylactic acid (PLA), to a material for the three-dimensional object has been limited.

The present invention provides a soluble material for three-dimensional modeling used as a support material, the soluble material being suitable for manufacturing a three-dimensional object by FDM, having a high dissolution rate in an alkaline aqueous solution, being capable of being removed quickly from the precursor of the three-dimensional object, and being capable of suppressing or reducing damage to the three-dimensional object; a method for manufacturing a three-dimensional object using the soluble material for three-dimensional modeling; and a support material.

The soluble material for three-dimensional modeling of the present invention is a soluble material for three-dimensional modeling that is used as a material of a support material that supports a three-dimensional object when manufacturing the three-dimensional object with a fused deposition modeling type 3D printer. The soluble material contains at least one copolymer selected from the group consisting of the following (I) to (III):

(I) a copolymer having at least one monomer unit selected from the group consisting of a hydrophilic monomer unit represented by the following Formula (1) and hydrophobic monomer units represented by the following Formulae (4) to (6), and having a content of the hydrophilic monomer unit of 20% by mass to 80% by mass;

(II) a copolymer having at least one monomer unit selected from the group consisting of a hydrophilic monomer unit represented by the following Formula (2) and a hydrophobic monomer unit represented by the following Formula (7), and having a content of the hydrophilic monomer unit of 20% by mass to 80% by mass; and (III) a copolymer having a hydrophilic monomer unit represented by the following Formula (3) and a hydrophobic monomer unit represented by the following Formula (8), and having a content of the hydrophilic monomer unit of 20% by mass to 80% by mass.

[Formula 17]

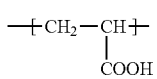
(1)

[Formula 18]

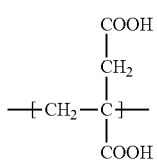
(2)

[Formula 19]

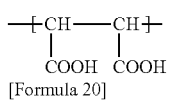
(3)

[Formula 20]

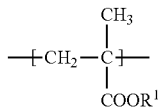
(4)

(wherein $R^1$ represents a straight chain alkyl group or a branched alkyl group each having 1 to 8 carbon atoms)

[Formula 21]

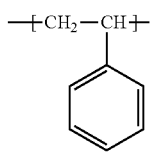
(5)

[Formula 22]

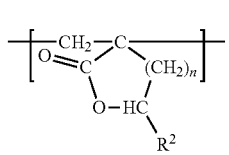
(6)

(wherein n is 1 to 3, and $R^2$ represents a hydrogen atom or a methyl group)

[Formula 23]

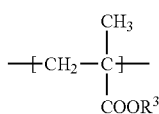
(7)

(wherein $R^3$ represents an alkyl group having 1 or 2 carbon atoms)

[Formula 24]

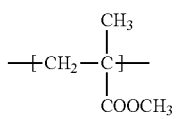
(8)

The method for manufacturing a three-dimensional object of the present invention is a method for manufacturing a three-dimensional object by fused deposition modeling, including a step of obtaining a precursor of a three-dimensional object containing the three-dimensional object and a support material, and a support material removing step of making the precursor of the three-dimensional object contact an alkaline aqueous solution to remove the support material. In the method, The material of the support material is the soluble material for three-dimensional modeling.

The support material of the present invention is a support material that supports a three-dimensional object when manufacturing the three-dimensional object by a fused deposition modeling type 3D printer, and contains at least one copolymer selected from the group consisting of the following (I) to (III):

(I) a copolymer having at least one monomer unit selected from the group consisting of a hydrophilic monomer unit represented by the following Formula (1) and hydrophobic monomer units represented by the following Formulae (4) to (6), and having a content of the hydrophilic monomer unit of 20% by mass to 80% by mass;

(II) a copolymer having at least one monomer unit selected from the group consisting of a hydrophilic monomer unit represented by the following Formula (2) and a hydrophobic monomer unit represented by the following Formula (7), and having a content of the hydrophilic monomer unit of 20% by mass to 80% by mass; and (III) a copolymer having a hydrophilic monomer unit represented by the following Formula (3) and a hydrophobic monomer unit represented by the following Formula (8), and having a content of the hydrophilic monomer unit of 20% by mass to 80% by mass.

[Formula 25]

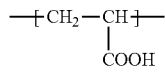

(1)

[Formula 26]

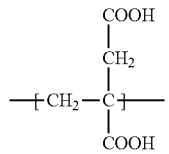

(2)

[Formula 27]

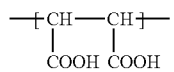

(3)

[Formula 28]

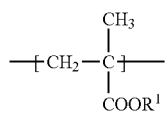

(4)

(wherein $R^1$ represents a straight chain alkyl group or a branched alkyl group each having 1 to 8 carbon atoms)

[Formula 29]

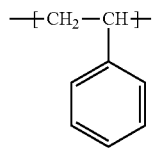

(5)

[Formula 30]

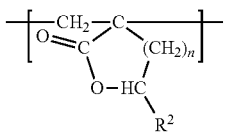

(6)

(wherein n is 1 to 3, and $R^2$ represents a hydrogen atom or a methyl group)

[Formula 31]

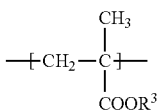

(7)

(wherein $R^3$ represents an alkyl group having 1 or 2 carbon atoms)

[Formula 32]

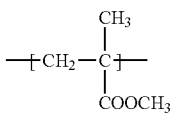

(8)

According to the present invention, it is possible to provide a soluble material for three-dimensional modeling used as a support material, the soluble material having a high dissolution rate in an alkaline aqueous solution, being capable of being removed quickly from the precursor of the three-dimensional object, and being capable of suppressing or reducing damage to the three-dimensional object.

According to the present invention, it is possible to provide a method for manufacturing a three-dimensional object that can be removed quickly from the precursor of the three-dimensional object and is capable of suppressing or reducing damage to the three-dimensional object.

According to the present invention, it is possible to provide a support material that has a high dissolution rate in an alkaline aqueous solution, can be removed quickly from the precursor of the three-dimensional object, and is capable of suppressing or reducing damage to the three-dimensional object.

One embodiment of the present invention will be explained below.

<Soluble Material for Three-Dimensional Modeling>

The soluble material for three-dimensional modeling of the present embodiment is a soluble material for three-dimensional modeling that is used as a material of a support material that supports a three-dimensional object when manufacturing the three-dimensional object with a fused deposition modeling type 3D printer. The soluble material contains at least one copolymer selected from the group consisting of the following (I) to (III):

(I) a copolymer having at least one monomer unit selected from the group consisting of a hydrophilic monomer unit represented by the Formula (1) and hydrophobic monomer units represented by the Formulae (4) to (6), and having a content of the hydrophilic monomer unit of 20% by mass to 80% by mass (hereinafter also referred to as a copolymer (I));

(II) a copolymer having at least one monomer unit selected from the group consisting of a hydrophilic monomer unit represented by the Formula (2) and a hydrophobic monomer unit represented by the Formula (7), and having a content of the hydrophilic monomer unit of 20% by mass to 80% by mass (hereinafter also referred to as a copolymer (II)); and (III) a copolymer having a hydrophilic monomer unit represented by the Formula (3) and a hydrophobic monomer unit represented by the Formula (8), and having a content of the hydrophilic monomer unit of 20% by mass to 80% by mass (hereinafter also referred to as a copolymer (III)).

The support material made from the soluble material for three-dimensional modeling has a high dissolution rate in an alkaline aqueous solution, can be removed quickly from the precursor of the three-dimensional object, and is capable of suppressing or reducing damage to the three-dimensional object. The reason why the soluble material for three-dimensional modeling exhibits such effects is not certain, but can be considered as follows.

The copolymer contained in a composition described in JP-T-2008-507619 contains a monomer unit originated from methacrylic acid. It is presumed that contact or diffusion of the copolymer to water or water-soluble alkali is suppressed or reduced due to hydrophobicity of a methyl group in an α position that is adjacent to a carboxyl group of the monomer unit originated from methacrylic acid. On the other hand, the copolymers (I) to (III) contained in the soluble material for three-dimensional modeling according to the present embodiment each have at least one monomer unit selected from the group consisting of monomer units originated from acrylic acid, itaconic acid, and maleic acid (fumaric acid) as a hydrophilic monomer unit. Because the hydrophilic monomer unit does not have a hydrophobic methyl group originated from methacrylic acid, the hydrophilic monomer unit has higher hydrophilicity than the monomer unit originated from methacrylic acid does. It is considered that the hydrophilicity to water increases, the diffusion of alkali into the surface/inside of the polymer can be improved, and the solubility of the copolymer in the alkaline aqueous solution is improved if the hydrophilic monomer unit is incorporated into the polymer. In addition, the hydrophobic monomer unit tends to be segregated on the surface of the support material because the surface forms a boundary with air. Accordingly, it is considered that more hydrophobic monomer units are segregated on the surface with the copolymer containing the hydrophobic monomer units and the hydrophilic monomer units in which the hydrophobic monomer units are connected to each other. Accordingly, it is considered that the hydrophilic monomer units and the hydrophobic monomer units are uniformly dispersed like an alternating polymer to prevent the segregation of the hydrophobic monomer units on the surface of the support material and improve the hydrophilicity of the surface of the support material. The uniformity of the monomer units in the copolymer produced by radical polymerization can be estimated from a radical reactivity ratio between monomers if the copolymer consists of two types of monomers. This reactivity ratio can be calculated from the Alfrey-Price equation (Kagakudojin, Takayuki Otsu, et al., "Experimental Technique of Polymer synthesis", 1972, Eighth Edition, pp. 192-193) using Q-e values (Wiley, J. Brandrup, et al., Polymer Handbook, Fourth Edition, Volume 1, pp. 11309-11319) which are values inherent in a monomer representing a conjugate property and an electron density of a monomer. The ratio ($r_1=k_{11}/k_{12}$) of a rate constant ($k_{11}$) for polymerization between the hydrophilic monomers to a rate constant ($k_{12}$) for polymerization of the hydrophobic monomer (alkyl methacrylate) after the polymerization of the hydrophilic monomers is methacrylic acid (0.98 to 1.1)>acrylic acid (0.58 to 0.78)>itaconic acid (0.39 to 0.49)>maleic anhydride (about 0). The smaller this value is, the easier the hydrophilic monomer radical to react with the hydrophobic monomer and the higher the possibility of generating a polymer in which the hydrophilic monomer has a uniform distribution close to that of an alternating copolymer. Accordingly, the hydrophilic monomer units can be uniformly dispersed in an alternating copolymer, the segregation of the hydrophobic monomer units on the surface of the support material can be prevented, and the hydrophilicity of the surface of the support material can be improved. It is considered that the hydrophilic monomer units and the hydrophobic monomer units are uniformly dispersed in the copolymers (I) to (III), the segregation of the hydrophobic monomer units on the surface of the support material is prevented, and the hydrophilicity of the surface of the support material can be improved because the combination of the hydrophilic monomer unit and the hydrophobic monomer unit in the copolymers (I) to (III) contained in the soluble material for three-dimensional modeling of the present embodiment has a small rate constant. On the other hand, the copolymers (II) and (III) containing itaconic acid and maleic anhydride having a smaller $r_1$ have a structure with a higher alternating copolymerization property than that of acrylic acid, a chain of the hydrophilic units sandwiched between the hydrophobic monomer units tends to be shorter than that of acrylic acid, and a chain of the hydrophobic monomer units tends to be longer than that of acrylic acid. Accordingly, the hydrophilic unit in the copolymers (II) and (III) can be easily influenced by the hydrophobic unit, and it is considered that it becomes more difficult for water to contact the hydrophilic unit as the hydrophobicity of the hydrophobic unit is higher, and the dissolution rate decreases. Accordingly, it is believed that the support material made from the soluble material for three-dimensional modeling of the present embodiment containing the copolymers (I) to (III) is suitable for manufacturing a three-dimensional object by FDM, has a higher dissolution rate in an alkaline aqueous solution, can be promptly removed from the precursor of the three-dimensional object, and can suppress or reduce damage to the three-dimensional object.

[Copolymer (I)]

The copolymer (I) is a copolymer having a hydrophilic monomer unit represented by the formula (1) (hereinafter also referred to as a hydrophilic monomer unit A) and at least one hydrophobic monomer unit selected from the group consisting of hydrophobic monomer units represented by the formulae (4) to (6) (hereinafter also referred to as a hydrophobic monomer unit A), in which the content of the hydrophilic monomer unit A in the copolymer (I) is 20% by mass to 80% by mass.

[Hydrophilic Monomer Unit A]

The hydrophilic monomer unit A is a monomer unit derived by polymerizing acrylic acid.

The content of the hydrophilic monomer unit A in the copolymer (I) is 20% by mass or more, preferably 22% by mass or more, and more preferably 30% by mass or more from the viewpoint of improving the dissolution rate in an alkaline aqueous solution. The content of the hydrophilic monomer unit A in the copolymer (I) is 80% by mass or less, preferably 60% by mass or less, and more preferably 55% by mass or less from the viewpoint of the storage stability of the soluble material for three-dimensional modeling and the support material obtained from the soluble material for three-dimensional modeling. From the combination of these viewpoints, the content of the hydrophilic monomer unit A in the copolymer (I) is 20% by mass to 80% by mass, preferably 22% by mass to 60% by mass, and more preferably 30% by mass to 55% by mass.

[Hydrophobic Monomer Unit A]
(Monomer Unit Represented by Formula (4))

The monomer unit represented by the formula (4) is a monomer unit derived by polymerizing an alkyl acrylate corresponding thereto.

In the formula (4), $R^1$ is preferably at least one member selected from the group consisting of a methyl group, an ethyl group, an n-propyl group, an i-propyl group, an n-butyl group, an i-butyl group, a t-butyl group, and a 2-ethylhexyl group. Among these, $R^1$ is more preferably at least one member selected from the group consisting of a methyl group, an ethyl group, and an n-butyl group, and further preferably a methyl group and/or an ethyl group from the viewpoints of improving the dissolution rate in an alkaline aqueous solution and the modeling properties by the 3D printer.

(Monomer Unit Represented by Formula (5))

The monomer unit represented by the formula (5) is a monomer unit derived by polymerizing styrene.

(Monomer Unit Represented by Formula (6))

The monomer unit represented by the formula (6) is a monomer unit derived by polymerizing an α-methylene-γ-valerolactone corresponding thereto.

Among the hydrophobic monomer units represented by the formulae (4) to (6), a monomer unit in which $R^1$ in the formula (4) is a methyl group, an ethyl group, or an n-butyl group, and a styrene monomer unit represented by the formula (5) are preferable, and a monomer unit in which $R^1$ in the formula (4) is a methyl group or an ethyl group, and a styrene monomer unit represented by the formula (5) are more preferable from the viewpoint of improving the dissolution rate.

The content of the hydrophobic monomer unit A in the copolymer (I) is preferably 20% by mass or more, more preferably 40% by mass or more, further preferably 45% by mass or more from the viewpoint of the storage stability of the soluble material for three-dimensional modeling and the support material obtained from the soluble material for three-dimensional modeling. The content of the hydrophobic monomer unit A in the copolymer (I) is preferably 80% by mass or less, more preferably 78% by mass or less, and further preferably 70% by mass or less from the viewpoint of improving the dissolution rate in an alkaline aqueous solution. From the combination of these viewpoints, the content of the hydrophobic monomer unit A in the copolymer (I) is preferably 20% by mass to 80% by mass, more preferably 40% by mass to 78% by mass, further preferably 45% by mass to 70% by mass.

The copolymer (I) may contain monomer units other than the hydrophilic monomer unit A and the hydrophobic monomer unit A as long as the effect of the soluble material for three-dimensional modeling according to the present embodiment is not impaired. Examples of the monomer units other than the hydrophilic monomer unit A and the hydrophobic monomer unit A include one or more monomer units selected from the group consisting of a monomer unit represented by the formula (2), a monomer unit represented by the formula (3), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

[Copolymer (II)]

The copolymer (II) is a copolymer having a hydrophilic monomer unit represented by the formula (2) (hereinafter also referred to as a hydrophilic monomer unit B) and at least one hydrophobic monomer unit selected from the group consisting of hydrophobic monomer units represented by the formula (7) (hereinafter also referred to as a hydrophobic monomer unit B), in which the content of the hydrophilic monomer unit B in the copolymer (II) is 20% by mass to 80% by mass.

[Hydrophilic Monomer Unit B]

The hydrophilic monomer unit B is a monomer unit derived by polymerizing itaconic acid.

The content of the hydrophilic monomer unit B in the copolymer (II) is 20% by mass or more, preferably 22% by mass or more, more preferably 30% by mass or more, and further preferably 35% by mass or more from the viewpoint of improving the dissolution rate in an alkaline aqueous solution. The content of the hydrophilic monomer unit B in the copolymer (II) is 80% by mass or less, preferably 60% by mass or less, more preferably 55% by mass or less, and further preferably 50% by mass or less from the viewpoint of the storage stability of the soluble material for three-dimensional modeling and the support material obtained from the soluble material for three-dimensional modeling. From the combination of these viewpoints, the content of the hydrophilic monomer unit B in the copolymer (II) is 20% by mass to 80% by mass, preferably 22% by mass to 60% by mass, more preferably 30% by mass to 55% by mass, and further preferably 35% by mass to 50% by mass.

[Hydrophobic Monomer Unit B]
(Monomer Unit Represented by Formula (7))

The hydrophobic monomer unit represented by the formula (7) is a monomer unit derived by polymerizing an alkyl acrylate corresponding thereto.

In the formula (7), $R^1$ is at least one member selected from the group consisting of a methyl group and an ethyl group. Among these, $R^1$ is preferably a methyl group from the viewpoint of improving the dissolution rate in an alkaline aqueous solution.

The content of the hydrophobic monomer unit B in the copolymer (II) is preferably 20% by mass or more, more preferably 40% by mass or more, further preferably 45% by mass or more, and further more preferably 50% by mass or more from the viewpoint of the storage stability of the soluble material for three-dimensional modeling and the support material obtained from the soluble material for three-dimensional modeling. The content of the hydrophobic monomer unit B in the copolymer (II) is preferably 80% by mass or less, more preferably 78% by mass or less, further preferably 70% by mass or less, and further preferably 65% by mass or less from the viewpoint of improving the dissolution rate in an alkaline aqueous solution. From the combination of these viewpoints, the content of the hydrophobic monomer unit B in the copolymer (II) is preferably 20% by mass to 80% by mass, more preferably 40% by mass to 78% by mass, further preferably 45% by mass to 70% by mass, and more preferably 50% by mass to 65% by mass.

The copolymer (II) may contain monomer units other than the hydrophilic monomer unit B and the hydrophobic monomer unit B as long as the effect of the soluble material for three-dimensional modeling according to the present embodiment is not impaired. Examples of the monomer units other than the hydrophilic monomer unit B and the hydrophobic monomer unit B include one or more monomer units selected from the group consisting of a monomer unit represented by the formula (1), a monomer unit represented by the formula (3), a monomer unit that is a hydrophobic monomer unit represented by the formula (4) in which $R^1$ is a straight chain alkyl group or a branched alkyl group having 3 to 8 carbon atoms, a hydrophobic monomer unit represented by the formula (5), a hydrophobic monomer unit represented by the formula (6), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

[Copolymer (III)]

The copolymer (III) is a copolymer having a hydrophilic monomer unit represented by the formula (3) (hereinafter also referred to as a hydrophilic monomer unit C) and a hydrophobic monomer unit represented by the formula (8) (hereinafter also referred to as a hydrophobic monomer unit C), in which the content of the hydrophilic monomer unit C in the copolymer (III) is 20% by mass to 80% by mass.

[Hydrophilic Monomer Unit C]

The hydrophilic monomer unit C is a monomer unit derived by polymerizing maleic acid and/or fumaric acid.

The content of the hydrophilic monomer unit C in the copolymer (III) is 20% by mass or more, preferably 22% by mass or more, and more preferably 30% by mass or more from the viewpoint of improving the dissolution rate in an alkaline aqueous solution. The content of the hydrophilic monomer unit C in the copolymer (III) is 80% by mass or less, preferably 60% by mass or less, more preferably 55% by mass or less, further preferably 50% by mass or less, and furthermore preferably 45% by mass or less from the viewpoint of the storage stability of the soluble material for three-dimensional modeling and the support material obtained from the soluble material for three-dimensional modeling. From the combination of these viewpoints, the content of the hydrophilic monomer unit C in the copolymer (III) is 20% by mass to 80% by mass, preferably 22% by mass to 60% by mass, more preferably 30% by mass to 55% by mass, further preferably 30% by mass to 50% by mass, and further more preferably 30% by mass or 45% by mass.

[Hydrophobic Monomer Unit C]

(Monomer Unit Represented by Formula (8))

The hydrophobic monomer unit represented by the formula (8) is a monomer unit derived by polymerizing methyl methacrylate.

The content of the hydrophobic monomer unit C in the copolymer (III) is preferably 20% by mass or more, more preferably 40% by mass or more, further preferably 45% by mass or more, furthermore preferably 50% by mass or more, and further more preferably 55% by mass or more from the viewpoint of the storage stability of the soluble material for three-dimensional modeling and the support material obtained from the soluble material for three-dimensional modeling. The content of the hydrophobic monomer unit C in the copolymer (III) is preferably 80% by mass or less, more preferably 78% by mass or less, and further preferably 70% by mass or less from the viewpoint of improving the dissolution rate in an alkaline aqueous solution. From the combination of these viewpoints, the content of the hydrophobic monomer unit C in the copolymer (III) is preferably 20% by mass to 80% by mass, more preferably 40% by mass to 78% by mass, further preferably 45% by mass to 70% by mass, further more preferably 50% by mass to 70% by mass, and further more preferably 55% by mass to 70% by mass.

The copolymer (III) may contain monomer units other than the hydrophilic monomer unit C and the hydrophobic monomer unit C as long as the effect of the soluble material for three-dimensional modeling according to the present embodiment is not impaired. Examples of the monomer units other than the hydrophilic monomer unit C and the hydrophobic monomer unit C include one or more monomer units selected from the group consisting of a monomer unit represented by the formula (1), a monomer unit represented by the formula (2), a monomer unit that is a hydrophobic monomer unit represented by the formula (4) in which $R^1$ is a straight chain alkyl group or a branched alkyl group having 2 to 8 carbon atoms, a monomer unit represented by the formula (5), a monomer unit represented by the formula (6), an α-hydroxyacrylic acid unit, a vinyl alcohol unit, a polyethylene glycol acrylate unit, a polyethylene glycol methacrylate unit, a methyl vinyl ether unit, a styrene sulfonic acid unit, a vinyl acetate unit, a vinyl propionate unit, an adamantyl methacrylate unit, an ethylene unit, and a propylene unit.

The glass transition temperature of each of the copolymers (I) to (III) is preferably 60° C. or higher, more preferably 70° C. or higher, further preferably 75° C. or higher, further more preferably 85° C. or higher, and further more preferably 90° C. or higher from the viewpoint of the modeling properties by the 3D printer. The glass transition temperature of each of the copolymers (I) to (III) is preferably 200° C. or lower, more preferably 180° C. or lower, further preferably 160° C. or lower, further more preferably 140° C. or lower, and further more preferably 130° C. or lower from the same viewpoint.

The weight average molecular weight of each of the copolymers (I) to (III) is preferably 20,000 or more, more preferably 50,000 or more, and further preferably 70,000 or more from the viewpoint of the modeling properties by the 3D printer. The weight average molecular weight of each of the copolymers (I) to (III) is preferably 500,000 or less, more preferably 470,000 or less, further preferably 450,000 or less, further more preferably 400,000 or less, further more preferably 350,000 or less from the viewpoints of improving the dissolution rate in an alkaline aqueous solution and the modeling properties by the 3D printer. From the combination of these viewpoints, the weight average molecular weight of each of the copolymers (I) to (III) is preferably 20,000 to 500,000, more preferably 20,000 to 470,000, further preferably 50,000 to 450,000, further more preferably 70,000 to 400,000, further more preferably 70,000 to 350,000. In the present description, the weight average molecular weight is measured by the method described in the examples.

The total content of the copolymers (I) to (III) in the soluble material for three-dimensional modeling is preferably 50% by mass or more, more preferably 60% by mass or more, further preferably 70% by mass or more, furthermore preferably 80% by mass or more from the viewpoint of improving the dissolution rate in an alkaline aqueous solution. The total content of the copolymers (I) to (III) in the soluble material for three-dimensional modeling is preferably 98% by mass or less, more preferably 95% by mass or less, and further preferably 92% by mass or less from the same viewpoint. From the combination of these viewpoints, the total content of the copolymers (I) to (III) in the soluble material for three-dimensional modeling is preferably 50% by mass to 98% by mass, more preferably 70% by mass to 98% by mass, further preferably 75% by mass to 95% by mass, further more preferably 80% by mass to 92% by mass.

[Plasticizer]

The soluble material for three-dimensional modeling preferably contains a plasticizer from the viewpoints of reducing the viscosity to make modeling easy during modeling with a 3D printer and imparting toughness to the support material.

The plasticizer is preferably at least one member selected from the group consisting of a polyester-based plasticizer, a polyhydric alcohol ester-based plasticizer, a polycarboxylic acid ester-based plasticizer, and a phosphoric acid ester-based plasticizer, more preferably a polycarboxylic acid ester-based plasticizer from the viewpoints of reducing the viscosity to make modeling easy during modeling with a 3D printer and imparting toughness to the support material. Examples of the plasticizer are described in the paragraph 0036 of JP-T-2008-507619. Particularly, examples of the polycarboxylic acid ester-based plasticizer include mono-, di-, or tri-esters of polyvalent carboxylic acid and mono-alcohol preferably having 1 to 12 carbon atoms, more preferably having 1 to 6 carbon atoms, and further preferably having 1 to 4 carbon atoms, or a (poly)oxyalkylene adduct thereof. Examples of the polycarboxylic acid include succinic acid, adipic acid, sebacic acid, terephthalic acid, and isophthalic acid. Examples of the mono-alcohol include methanol, ethanol, 1-propanol, and 1-butanol. Specific examples include an ester of succinic acid and polyethylene glycol monomethyl ether in which the average addition molar number of ethylene oxide is 2 to 3 (addition of 2 to 3 mol of ethylene oxide per 1 mol of hydroxyl group), a diester compound of succinic acid and triethylene glycol monomethyl ether, and a diester of succinic acid and 1,3-propanediol. More specific examples include DAIFATTY-101 (a 1:1 mixed ester of adipic acid methyl diglycol/benzyl alcohol, manufactured by Daihachi Chemical Industry Co., Ltd.) and ECOLA A1010 (succinic acid methyl triglycol diester, manufactured by Kao Corporation).

Examples of the phosphoric acid ester-based plasticizer include mono-, di-, or tri-esters of phosphoric acid and the above-described mono-alcohol or a (poly)oxyalkylene adduct thereof. Specific examples include tributyl phosphate, tri-2-ethylhexyl phosphate, trioctyl phosphate, triphenyl phosphate, diphenyl-2-ethylhexyl phosphate, tricresyl phosphate, and tris(ethoxyethoxyethyl)phosphate.

The content of the plasticizer in the soluble material for three-dimensional modeling is preferably 2% by mass or more, more preferably 5% by mass or more, and further preferably 10 by mass or more from the viewpoints of reducing the viscosity to make modeling easy during modeling with a 3D printer and imparting toughness to the support material. The content of the plasticizer in the soluble material for three-dimensional modeling is preferably 30% by mass or less, more preferably 25% by mass or less, and further preferably 20% by mass or less with respect to 100% by mass of the polymer in the soluble material for three-dimensional modeling from the viewpoint of the modeling properties by the 3D printer. From the combination of these viewpoints, the content of the plasticizer in the soluble material for three-dimensional modeling is preferably 2% by mass to 30% by mass, more preferably 5% by mass to 25% by mass, and further preferably 10% by mass to 20% by mass.

In the case in which the soluble material for three-dimensional modeling contains the plasticizer, all of the SP values of the copolymers (I) to (III) and the SP value of the plasticizer are preferably 8 or more, more preferably 8.5 or more, and further preferably 9 or more from the viewpoint of the compatibility among the copolymers (I) to (III) and the plasticizer. All of the SP values of the copolymers (I) to (III) and the SP value of the plasticizer are preferably 13 or less, more preferably 12 or less, and further preferably 11.5 or less from the same viewpoint. From the combination of these viewpoints, all of the SP values of the copolymers (I) to (III) and the SP value of the plasticizer are preferably 8 to 13, more preferably 8.5 to 12, and further preferably 9 to 11.5. In the present description, the SP value means an amount defied by the following formula:

$$SP\ \text{value} = (\Delta E/V)^{1/2}\ (\text{cal}^{1/2}\ \text{cm}^{-3/2})$$

wherein $\Delta E$ is a cohesive energy and $V$ is a molecular volume, and the SP value can be calculated using a Fedors' method described on page 48 of "Basic Science of Coating" written by Yuji Harasaki, published by Maki Shoten in 1988.

The soluble material for three-dimensional modeling may contain a polymer other than the copolymers (I) to (III) as long as the effect of the soluble material for three-dimensional modeling according to the present embodiment is not impaired. Examples of the polymer other than the copolymers (I) to (III) include water-soluble polymers such as polyvinyl alcohol, polyethylene glycol, poly(ethylene glycol/polypropylene glycol), carboxymethyl cellulose, and starch; a polyether ester and a polyether ester amide that are each an elastomer consisting of hard segments and soft segments; a graft polymer obtained by grafting a hydrophobic rubber with a polymer such as polyacrylic acid having a hydrophilic group; a graft polymer obtained by grafting silicone with polyoxazoline; hydrophilic thermoplastic elastomers such as an ionic elastomer; water-insoluble polymers such as a thermoplastic elastomer such as a styrene-butadiene copolymer, and a polymethylmethacrylate-polybutylacrylate-polymethylmethacrylate copolymer.

In the case in which the soluble material for three-dimensional modeling contains a polymer other than the copolymers (I) to (III), both of the SP value of the copolymers (I) to (III) and the SP value of the polymer other than the copolymers (I) to (III) are preferably 8 or more, more preferably 8.5 or more, and further preferably 9 or more from the viewpoint of the compatibility between the copolymers (I) to (III) and the polymer other than the copolymers (I) to (III). Both of the SP value of the copolymers (I) to (III) and the SP value of the polymer other than the copolymers (I) to (III) are preferably 13 or less, more preferably 12 or less, and further preferably 11.5 or less from the same viewpoint. From the combination of these viewpoints, both of the SP value of the copolymers (I) to (III) and the SP value of the polymer other than the copolymers (I) to (III) are preferably 8 to 13, more preferably 8.5 to 12, and further preferably 9 to 11.5.

The shape of the soluble material for three-dimensional modeling is not particularly limited; examples include a pellet shape, a powder shape, and a filament shape. However, the filament shape is preferable from the viewpoint of the modeling properties by the 3D printer.

The diameter of the filament is preferably 0.5 mm or more, and more preferably 1.0 mm or more from the viewpoints of the modeling properties by the 3D printer and improving the accuracy of the three-dimensional object. The diameter of the filament is preferably 3.0 mm or less, more preferably 2.0 mm or less, and further preferably 1.8 mm or less from the viewpoints of the modeling properties by the 3D printer and improving the accuracy of the three-dimensional object.

The glass transition temperature of the soluble material for three-dimensional modeling is preferably 60° C. or higher, more preferably 70° C. or higher, and further preferably 75° C. or higher from the viewpoint of the modeling properties by the 3D printer. The glass transition temperature of the soluble material for three-dimensional modeling is preferably 200° C. or lower, more preferably 160° C. or lower, and further preferably 140° C. or lower from the same viewpoint.

The soluble material for three-dimensional modeling may contain other components as long as the effect of the present embodiment is not impaired. Examples of the other components include fillers such as calcium carbonate, magnesium carbonate, glass sphere, graphite, carbon black, carbon fiber, glass fiber, talk, wollastonite, mica, alumina, silica, kaolin, whisker, and silicon carbide.

<Method for Manufacturing Three-Dimensional Object>

The method for manufacturing a three-dimensional object of the present embodiment is a method for manufacturing a three-dimensional object by fused deposition modeling, and includes a step of obtaining a precursor of a three-dimensional object containing the three-dimensional object and a support material, and a support material removing step of making the precursor of the three-dimensional object contact an alkaline aqueous solution to remove the support material. The material of the support material is the soluble material for three-dimensional modeling. The method for manufacturing a three-dimensional object can be removed quickly from the precursor of the three-dimensional object and is capable of suppressing or reducing damage to the three-dimensional object. The reason why the method for manufacturing a three-dimensional object exhibits such an effect is not clear; however, the reason is presumably the same as the reason why the soluble material for three-dimensional modeling exhibits the effect.

[Step of Obtaining Precursor of Three-Dimensional Object Containing Three-Dimensional Object and Support Material]

As the step of obtaining a precursor of a three-dimensional object containing the three-dimensional object and the support material, a step of obtaining a precursor of a three-dimensional object containing the three-dimensional object and the support material of a known method for manufacturing a three-dimensional object with a fused deposition modeling type 3D printer can be used, except that the material of the support material is the soluble material for three-dimensional modeling.

For the modeling material that is a material of the three-dimensional object, any material can be used without particular limitation as long as the material is a resin that is used as a modeling material in the conventional method for manufacturing a three-dimensional object of an FDM system. Examples of the modeling material include thermoplastic resins such as an ABS resin, a polylactic resin, a polycarbonate resin, and a polyphenylsulfone resin, and among these, an ABS resin and/or a polylactic resin are more preferable, and an ABS resin is further preferable from the viewpoint of the modeling properties by the 3D printer.

[Support Material Removing Step of Making Precursor of Three-Dimensional Object Contact Alkaline Aqueous Solution to Remove Support Material]

The precursor of the three-dimensional object is made to contact an alkaline aqueous solution to remove the support material in the support material removing step. The method of making the precursor of the three-dimensional object contact an alkaline aqueous solution is preferably a method of soaking the precursor of the three-dimensional object in an alkaline aqueous solution from the viewpoints of cost and ease of work. From the viewpoint of improving removability of the support material, the precursor of the three-dimensional object is irradiated with ultrasonic waves while being soaked in the alkaline aqueous solution to promote dissolution of the support material.

[Alkaline Aqueous Solution]

Carboxylic acid is introduced to the soluble material for three-dimensional modeling. Thus, the support material obtained by modeling the soluble material for three-dimensional modeling is neutralized with an alkaline agent to be dissolved in an alkaline aqueous solution.

The alkaline aqueous solution is an aqueous solution in which an alkaline agent is dissolved. The alkaline agent is preferably at least one member selected from the group consisting of sodium hydroxide, potassium hydroxide, sodium carbonate, sodium hydrogen carbonate, ammonia, and amine such as monoethanolamine and diethanolamine, and more preferably at least one member selected from the group consisting of sodium hydroxide, potassium hydroxide, sodium carbonate, monoethanolamine from the viewpoint of solubility of the support material. The alkaline aqueous solution may contain one or more water-soluble solvents such as alkylene glycol alkylether and glyceryl ether represented by $R-OCH_2CH(OH)CH_2OH$ (R is a group selected from an alkyl group, an alkenyl group, a benzyl group, a phenyl group, a furfuryl group and a furfurylmethyl group) and one or more surfactants such as an anionic surfactant, a cationic surfactant, a nonionic surfactant and an amphoteric surfactant; and examples of the alkaline aqueous solution include Magiclean (registered trademark, manufactured by Kao Corporation).

The pH of the alkaline aqueous solution is preferably 10 or more, and more preferably 11 or more from the viewpoint of solubility of the support material. The pH of the alkaline aqueous solution is preferably 14 or less, and more preferably 13 or less from the viewpoint of suppressing or reducing damage to the modeling material. From the combination of these viewpoints, the pH of the alkaline aqueous solution is preferably 10 to 14, more preferably 10 to 13, and further preferably 11 to 13.

The alkaline aqueous solution may further contain other components as long as the solubility of the support material is not impaired. Examples of the other components include water-soluble polymers such as sodium polyacrylate.

The amount of the alkaline aqueous solution used is preferably 10 mass times or more, and more preferably 20 mass times or more the support material from the viewpoint of the solubility of the support material. The amount of the alkaline aqueous solution used is preferably 10,000 mass times or less, more preferably 5,000 mass times or less, further preferably 1,000 mass times or less, and further more preferably 100 mass times or less the support material from the viewpoint of workability.

The period of contact between the soluble material for three-dimensional modeling and the alkaline aqueous solution and/or water is preferably 5 minutes or more from the viewpoint of removability of the support material. The period of contact between the soluble material for three-dimensional modeling and the alkaline aqueous solution is preferably 180 minutes or less, more preferably 120 minutes or less, and further preferably 90 minutes or less from the viewpoint of reducing damage to the three-dimensional object caused by soaking the three-dimensional object in the alkaline aqueous solution for a long period of time. From the combination of these viewpoints, the period of contact between the soluble material for three-dimensional modeling and the alkaline aqueous solution is preferably 5 minutes to 180 minutes, more preferably 5 minutes to 120 minutes, and further preferably 5 minutes to 90 minutes.

<Support Material>

The support material of the present embodiment is a support material that supports a three-dimensional object when manufacturing the three-dimensional object by a fused deposition modeling type 3D printer, and contains at least one copolymer selected from the group consisting of the copolymers (I) to (III). The support material can be removed quickly from the precursor of the three-dimensional object and is capable of suppressing or reducing damage to the three-dimensional object. The reason why the method for manufacturing a three-dimensional object exhibits such an effect is not clear; however, the reason is presumably the same as the reason why the soluble material for three-dimensional modeling exhibits the effect.

With respect to the above-described embodiment, the present description further discloses the following composition and manufacturing method.

<1> A soluble material for three-dimensional modeling that is used as a material of a support material that supports a three-dimensional object when manufacturing the three-dimensional object with a fused deposition modeling type 3D printer,
  comprising at least one copolymer selected from the group consisting of (I) to (III):
  (I) a copolymer having at least one monomer unit selected from the group consisting of a hydrophilic monomer unit represented by the Formula (1) and hydrophobic monomer units represented by the Formulae (4) to (6), and having a content of the hydrophilic monomer unit of 20% by mass to 80% by mass;
  (II) a copolymer having at least one monomer unit selected from the group consisting of a hydrophilic monomer unit represented by the Formula (2) and a hydrophobic monomer unit represented by the Formula (7), and having a content of the hydrophilic monomer unit of 20% by mass to 80% by mass; and
  (III) a copolymer having a hydrophilic monomer unit represented by the Formula (3) and a hydrophobic monomer unit represented by the Formula (8), and having a content of the hydrophilic monomer unit of 20% by mass to 80% by mass:

<2> The soluble material for three-dimensional modeling according to <1>, in which the content of the hydrophilic monomer unit A represented by the formula (1) in the copolymer (I) is 20% by mass or more, preferably 22% by mass or more, more preferably 30% by mass or more, 80% by mass or less, preferably 60% by mass or less, more preferably 55% by mass or less.

<3> The soluble material for three-dimensional modeling according to <1> or <2>, in which the content of the hydrophilic monomer unit A represented by the formula (1) in the copolymer (I) is 20% by mass to 80% by mass, preferably 22% by mass to 60% by mass, and more preferably 30% by mass to 55% by mass.

<4> The soluble material for three-dimensional modeling according to any one of <1> to <3>, in which in the formula (4), $R^1$ is preferably at least one member selected from the group consisting of a methyl group, an ethyl group, an n-propyl group, an i-propyl group, an n-butyl group, an i-butyl group, a t-butyl group, and a 2-ethylhexyl group, more preferably at least one member selected from the group consisting of a methyl group, an ethyl group, and an n-butyl group, and further preferably a methyl group and/or an ethyl group.

<5> The soluble material for three-dimensional modeling according to any one of <1> to <4>, in which the total content of at least one member selected from the group consisting of the hydrophobic monomer units represented by the formulae (4) and (6) in the copolymer (I) is preferably 20% by mass or more, more preferably 40% by mass or more, further preferably 45% by mass or more, further more preferably 45% by mass or more, preferably 80% by mass or less, more preferably 78% by mass or less, further preferably 70% by mass or less.

<6> The soluble material for three-dimensional modeling according to any one of <1> to <5>, in which the total content of at least one member selected from the group consisting of the hydrophobic monomer units represented by the formulae (4) and (6) in the copolymer (I) is preferably 20% by mass to 80% by mass, more preferably 40% by mass to 78% by mass, further preferably 45% by mass to 70% by mass.

<7> The soluble material for three-dimensional modeling according to any one of <1> to <6>, in which the hydrophobic monomer units represented by the formulae (4) to (6) are preferably a monomer unit in which $R^1$ in the formula (4) is a methyl group, an ethyl group, or an n-butyl group and a styrene monomer unit represented by the formula (5), and more preferably a monomer unit in which $R^1$ in the formula (4) is a methyl group or an ethyl group and a styrene monomer unit represented by the formula (5).

<8> The soluble material for three-dimensional modeling according to any one of <1> to <7>, in which the content of the hydrophilic monomer unit represented by the formula (2) in the copolymer (II) is 20% by mass or more, preferably 22% by mass or more, more preferably 30% by mass or more, further preferably 35% by mass or more, 80% by mass or less, preferably 60% by mass or less, more preferably 55% by mass or less, further preferably 50% by mass or less.

<9> The soluble material for three-dimensional modeling according to any one of <1> to <8>, in which the content of the hydrophilic monomer unit represented by the formula (2) in the copolymer (II) is 20% by mass to 80% by mass, preferably 22% by mass to 60% by mass, more preferably 30% by mass to 55% by mass, and further preferably 35% by mass to 50% by mass.

<10> The soluble material for three-dimensional modeling according to any one of <1> to <9>, in which in the formula (7), $R^1$ is at least one member selected from the group consisting of a methyl group and an ethyl group, $R^1$ is preferably a methyl group.

<11> The soluble material for three-dimensional modeling according to any one of <1> to <10>, in which the content of the hydrophobic monomer unit represented by the formula (7) in the copolymer (II) is preferably 20% by mass or more, more preferably 40% by mass or more, further preferably 45% by mass or more, further more preferably 50% by mass or more, preferably 80% by mass or less, more preferably 78% by mass or less, further preferably 70% by mass or less, further more preferably 65% by mass or less.

<12> The soluble material for three-dimensional modeling according to any one of <1> to <11>, in which the content of the hydrophobic monomer unit represented by the formula (7) in the copolymer (II) is preferably 20% by mass to 80% by mass, more preferably 40% by mass to 78% by mass, further preferably 45% by mass to 70% by mass, and further more preferably 50% by mass to 65% by mass.

<13> The soluble material for three-dimensional modeling according to any one of <1> to <12>, in which the content of the hydrophilic monomer unit represented by the formula (3) in the copolymer (III) is 20% by mass or more, preferably 22% by mass or more, more preferably 30% by mass or more, 80% by mass or less, preferably 60% by mass or less, more preferably 55% by mass or less, further preferably 50% by mass or less, further more preferably 45% by mass or less.

<14> The soluble material for three-dimensional modeling according to any one of <1> to <13>, in which the content of the hydrophilic monomer unit represented by the formula (3) in the copolymer (III) is 20% by mass to 80% by mass, preferably 22% by mass to 60% by mass, more preferably 30% by mass to 55% by mass, further preferably 30% by mass to 50% by mass, and further more preferably 30% by mass or 45% by mass.

<15> The soluble material for three-dimensional modeling according to any one of <1> to <14>, in which the content of the hydrophobic monomer unit represented by the formula (8) in the copolymer (III) is preferably 20% by mass or more, more preferably 40% by mass or more, further preferably 45% by mass or more, further preferably 50% by mass or more, further more preferably 55% by mass or more, preferably 80% by mass or less, more preferably 78% by mass or less, further preferably 70% by mass or less.

<16> The soluble material for three-dimensional modeling according to any one of <1> to <15>, in which the content of the hydrophobic monomer unit represented by the formula (8) in the copolymer (III) is preferably 20% by mass to 80% by mass, more preferably 40% by mass to 78% by mass, further preferably 45% by mass to 70% by mass, further preferably 50% by mass to 70% by mass, and further more preferably 55% by mass to 70% by mass.

<17> The soluble material for three-dimensional modeling according to any one of <1> to <16>, in which the glass transition temperature of each of the copolymers (I) to (III) is preferably 60° C. or higher, more preferably 70° C. or higher, further preferably 75° C. or higher, further more preferably 85° C. or higher, further more preferably 90° C. or higher, preferably 200° C. or lower, more preferably 180° C. or lower, further preferably 160° C. or lower, further more preferably 140° C. or lower, and further more preferably 130° C. or lower.

<18> The soluble material for three-dimensional modeling according to any one of <1> to <18>, in which the weight average molecular weight of each of the copolymers (I) to (III) is preferably 20,000 or more, more preferably 50,000 or more, further preferably 70,000 or more, preferably 500,000 or less, more preferably 470,000 or less, further preferably 450,000 or less, further more preferably 400,000 or less, further more preferably 350,000 or less.

<19> The soluble material for three-dimensional modeling according to any one of <1> to <17>, in which the weight average molecular weight of each of the copolymers (I) to (III) is preferably 20,000 to 500,000, more preferably 20,000 to 470,000, further preferably 50,000 to 450,000, further more preferably 70,000 to 400,000, and further more preferably 70,000 to 350,000.

<20> The soluble material for three-dimensional modeling according to any one of <1> to <19>, in which the total content of the copolymers (I) to (III) in the soluble material for three-dimensional modeling is preferably 50% by mass or more, more preferably 60% by mass or more, further preferably 70% by mass or more, further more preferably 80% by mass or more, preferably 98% by mass or less, more preferably 92% by mass or less, further preferably 90% by mass or less.

<21> The soluble material for three-dimensional modeling according to any one of <1> to <20>, in which the total content of the copolymers (I) to (III) in the soluble material for three-dimensional modeling is preferably 50% by mass to 98% by mass, more preferably 70% by mass to 98% by mass, further preferably 75% by mass to 95% by mass, and further more preferably 80% by mass to 92% by mass.

<22> The soluble material for three-dimensional modeling according to any one of <1> to <21>, in which the soluble material for three-dimensional modeling contains a plasticizer.

<23> The soluble material for three-dimensional modeling according to any one of <1> to <22>, in which the plasticizer is preferably at least one member selected from the group consisting of a polyester-based plasticizer, a polyhydric alcohol ester-based plasticizer, a polycarboxylic acid ester-based plasticizer, and a phosphoric acid ester-based plasticizer, more preferably a polycarboxylic acid ester-based plasticizer.

<24> The soluble material for three-dimensional modeling according to any one of <1> to <23>, in which the polycarboxylic acid ester-based plasticizer is mono-, di-, or tri-esters of polyvalent carboxylic acid and mono-alcohol preferably having 1 to 12 carbon atoms, more preferably having 1 to 6 carbon atoms, and further preferably having 1 to 4 carbon atoms, or a (poly)oxyalkylene adduct thereof.

<25> The soluble material for three-dimensional modeling according to any one of <1> to <24>, in which the content of the plasticizer in the soluble material for three-dimensional modeling is preferably 2 part by mass or more, more preferably 5 parts by mass or more, further preferably 10 parts by mass or more, preferably 30 parts by mass or less, more preferably 25 parts by mass or less, and further preferably 20 parts by mass or less with respect to 100 parts by mass of the copolymer in the soluble material for three-dimensional modeling.

<26> The soluble material for three-dimensional modeling according to any one of <1> to <25>, in which the content of the plasticizer in the soluble material for three-dimensional modeling is preferably 2 part by mass to 30 parts by mass, more preferably 5 parts by mass to 25 parts by mass, and further preferably 10 parts by mass to 20 parts by mass with respect to 100 parts by mass of the copolymer in the soluble material for three-dimensional modeling.

<27> The soluble material for three-dimensional modeling according to any one of <1> to <26>, in the case in which the soluble material for three-dimensional modeling contains the plasticizer, all of the SP values of the copolymers (I) to (III) and the SP value of the plasticizer are preferably 8 or more, more preferably 8.5 or more, further preferably 9 or more, preferably 13 or less, more preferably 12 or less, and further preferably 11.5 or less.

<28> The soluble material for three-dimensional modeling according to any one of <1> to <27>, in the case in which the soluble material for three-dimensional modeling contains the plasticizer, all of the SP values of the copolymers (I) to (III) and the SP value of the plasticizer are preferably 8 to 13, more preferably 8.5 to 12, and further preferably 9 to 11.5.

<29> The soluble material for three-dimensional modeling according to any one of <1> to <28>, in which the soluble material for three-dimensional modeling contains a polymer other than the copolymers (I) to (III).

<30> The soluble material for three-dimensional modeling according to any one of <1> to <29>, in which the polymer other than the copolymers (I) to (III) is at least one member selected from the group consisting of water-soluble polymers selected from polyvinyl alcohol, polyethylene glycol, poly(ethylene glycol/polypropylene glycol), carboxymethyl cellulose, and starch; elastomers selected from a polyether ester and a polyether ester amide consisting of hard segments and soft segments; hydrophilic thermoplastic elastomers selected from a graft polymer obtained by grafting a hydrophobic rubber with a polymer such as polyacrylic acid having a hydrophilic group, a graft polymer obtained by grafting silicone with polyoxazoline, an ionic elastomer; water-insoluble polymers selected from a thermoplastic elastomer such as a styrene-butadiene copolymer, and a polymethylmethacrylate-polybutylacrylate-polymethylmethacrylate copolymer.

<31> The soluble material for three-dimensional modeling according to any one of <1> to <30>, in which all of the SP values of the copolymers (I) to (III) and the SP value of the polymer other than the copolymers (I) to (III) are preferably 8 or more, more preferably 8.5 or more, further preferably 9 or more, preferably 13 or less, more preferably 12 or less, and further preferably 11.5 or less.

<32> The soluble material for three-dimensional modeling according to any one of <1> to <31>, in which all of the SP values of the copolymers (I) to (III) and the SP value of the polymer other than the copolymers (I) to (III) are preferably 8 to 13, more preferably 8.5 to 12, and further preferably 9 to 11.5.

<33> The soluble material for three-dimensional modeling according to any one of <1> to <32>, in which the shape of the soluble material for three-dimensional modeling is preferably a pellet shape, a powder shape, or a filament shape, and more preferably a filament shape.

<34> The soluble material for three-dimensional modeling according to <33>, in which the diameter of the filament is preferably 0.5 mm or more, more preferably 1.0 mm or more, preferably 3.0 mm or less, more preferably 2.0 mm or less, and further preferably 1.8 mm or less.

<35> The soluble material for three-dimensional modeling according to any one of <1> to <34>, in which the glass transition temperature of the soluble material for three-dimensional modeling is preferably 60° C. or higher, more preferably 70° C. or higher, further preferably 75° C. or higher, preferably 200° C. or lower, more preferably 160° C. or lower, and further preferably 140° C. or lower.

<36> A method for manufacturing a three-dimensional object by fused deposition modeling, including a step of obtaining a precursor of a three-dimensional object containing the three-dimensional object and a support material, and a support material removing step of making the precursor of the three-dimensional object contact an alkaline aqueous solution to remove the support material, in which the material of the support material is the soluble material for three-dimensional modeling according to any one of <1> to <35>.

<37> The method for manufacturing a three-dimensional object according to <36>, in which a modeling material as a material for the three-dimensional object is preferably at least one member selected from the group consisting of an ABS resin, a polylactic resin, a polycarbonate resin, and a polyphenylsulfone resin, more preferably an ABS resin and/or a polylactic resin, and further preferably an ABS resin.

<38> The method for manufacturing a three-dimensional object according to <36> or <37>, in which a technique of making the precursor of the three-dimensional object contact the alkaline aqueous solution in the support material removing step is preferably a technique of soaking the precursor of the three-dimensional object in the alkaline aqueous solution, and more preferably a method of irradiating the precursor of the three-dimensional object with ultrasonic waves while being soaked in the alkaline aqueous solution to promote dissolution of the support material.

<39> The method for manufacturing a three-dimensional object according to any one of <36> to <38>, in which the alkaline aqueous solution is preferably at least one member selected from the group consisting of sodium hydroxide, potassium hydroxide, sodium carbonate, sodium hydrogen carbonate, ammonia, and amine such as monoethanolamine and diethanolamine, and more preferably at least one member selected from the group consisting of sodium hydroxide, potassium hydroxide, sodium carbonate, monoethanolamine.

<40> The method for manufacturing a three-dimensional object according to any one of <36> to <39>, in which the alkaline aqueous solution preferably contain at least one member selected from the group consisting of one or more water-soluble solvents selected from alkylene glycol alkylether and glyceryl ether represented by R—OCH$_2$CH(OH)CH$_2$OH (R is a group selected from an alkyl group, an alkenyl group, a benzyl group, a phenyl group, a furfuryl group and a furfurylmethyl group), and one or more surfactants selected from an anionic surfactant, a cationic surfactant, a nonionic surfactant and an amphoteric surfactant.

<41> The method for manufacturing a three-dimensional object according to any one of <36> to <40>, in which the pH of the alkaline aqueous solution is preferably 10 or more, more preferably 11 or more, preferably 14 or less, and more preferably 13 or less.

<42> The method for manufacturing a three-dimensional object according to any one of <36> to <41>, in which the pH of the alkaline aqueous solution is preferably 10 to 14, more preferably 10 to 13, and further preferably 11 to 13.

<43> The method for manufacturing a three-dimensional object according to any one of <36> to <42>, in which the period in which the soluble material for three-dimensional modeling is soaked in the alkaline aqueous solution is preferably 5 minutes or more, preferably 180 minutes or less, more preferably 120 minutes or less, and further preferably 90 minutes or less.

<44> The method for manufacturing a three-dimensional object according to any one of <36> to <43>, in which the period in which the soluble material for three-dimensional modeling is soaked in the alkaline aqueous solution is preferably 5 to 180 minutes, more preferably 5 to 120 minutes, and further preferably 5 to 90 minutes.

<45> A support material that supports a three-dimensional object when manufacturing the three-dimensional object by a fused deposition modeling type 3D printer, in which the support material contains at least one copolymer selected from the group consisting of the copolymers (I) to (III).

<46> The support material according to <45>, in which the three-dimensional object is manufactured by the method for manufacturing a three-dimensional object according to any one of <36> to <44>.

<47> Use of the soluble material for three-dimensional modeling according to any one of <1> to <35> as a material of the support material.

EXAMPLES

<Evaluation Methods>
[Molecular Weight and Molecular Weight Distribution]
A calibration curve was generated from standard polystyrene using a gel permeation chromatography (GPC) method under the following conditions to obtain the weight average molecular weight (Mw).

(Measurement Conditions)
Apparatus: HLC-8320 GPC (detector integrated type, manufactured by Tosoh Corporation)
Column: α-M×2 columns (7.8 mm I.D.×30 cm, manufactured by Tosoh Corporation)
Eluent: 60 mmol/l Phosphoric acid+50 mmol/l brominated lithium dimethylformamide solution
Flow rate: 1.0 ml/min
Column temperature: 40° C.
Detector: RI detector
Standard substance: polystyrene
[Glass Transition Temperature]

A portion of the amorphous film was cut out, and 5 mg to 10 mg of the film was precisely weighed and sealed in an aluminum pan. The aluminum pan was heated from 25° C. to 250° C. at 10° C./min, and rapidly cooled to 25° C. using a DSC apparatus ("DSC7020" manufactured by Seiko Instruments Inc.). Then, the temperature was increased again to 250° C. at 10° C./min to obtain a DSC curve. The glass transition temperature (° C.) was obtained from the DSC curve.

[Content of Hydrophilic Unit]

The content of the hydrophobic unit and the hydrophilic unit was calculated by proton NMR measurement.

Synthesis of Polymer

Synthesis Example 1

In a 3-liter glass reactor equipped with two dropping funnels, a cooling tube, a thermometer, and a stirring blade, 150 g of acetone and 150 g of ethanol were charged. Nitrogen bubbling was performed for 30 minutes, and the temperature was increased to 60° C. Then, each of the following formulations 1 and 2 was dropped in 60 minutes. The mixture was kept at 60° C., and the polymerization reaction was continued for 5 hours. The solvent was removed from the mixture by evaporation, and the mixture was dried in a vacuum dryer at 60° C. overnight to obtain a polymer 1.
Formulation 1: acrylic acid (manufactured by Kanto Chemical Co., Ltd.) 200 g, methyl methacrylate (manufactured by Wako Pure Chemical Industries, Ltd.) 300 g, acetone 250 g, ethanol 250 g
Formulation 2: V-65B (2,2'-azobis(2,4-dimethylvaleronitrile) manufactured by Wako Pure Chemical Industries, Ltd.) 7.17 g, acetone 100 g, ethanol 100 g Synthesis Example 2

In a 500-mL glass reactor equipped with a cooling tube, a thermometer, and a stirring blade, 7.5 g of acrylic acid, 17.5 g of methyl methacrylate, 50 g of acetone, and 50 g of ethanol were charged, nitrogen bubbling was performed for 30 minutes, and the temperature was increased to 60° C. Then, 0.087 g of V-65B was added. The mixture was kept at 60° C., and polymerization was performed for 6 hours. The solvent was removed from the mixture by evaporation, and the mixture was dried in a vacuum dryer at 60° C. overnight to obtain a polymer 2.

Synthesis Example 3

A polymer 3 was obtained in the same way as in Synthesis Example 1 except that the amount of the acrylic acid was changed to 250 g, the amount of the methyl methacrylate was changed to 250 g, and the amount of V-65B was changed to 7.41 g.

Synthesis Example 4

A polymer 4 was obtained in the same way as in Synthesis Example 2 except that the amount of the acrylic acid was changed to 15 g, the amount of the methyl methacrylate was changed to 10 g, and the amount of V-65B was changed to 0.096 g.

Synthesis Example 5

A polymer 5 was obtained in the same way as in Synthesis Example 1 except that the methyl methacrylate was changed to ethyl methacrylate (manufactured by Wako Pure Chemical Industries, Ltd.) and the amount of V-65B was changed to 6.71 g.

Synthesis Example 6

A polymer 6 was obtained in the same way as in Synthesis Example 1 except that the methyl methacrylate was changed to butyl methacrylate (manufactured by Wako Pure Chemical Industries, Ltd.) and the amount of V-65B was changed to 6.07 g.

Synthesis Example 7

A polymer 7 was obtained in the same way as in Synthesis Example 1 except that the methyl methacrylate was changed to styrene (manufactured by Wako Pure Chemical Industries, Ltd.) and the amount of V-65B was changed to 7.03 g.

Synthesis Example 8

A polymer 8 was obtained in the same way as in Synthesis Example 2 except that the amount of the acrylic acid was changed to 10 g, the methyl methacrylate was changed to 15 g of α-methylene-γ-valerolactone (manufactured by Kanto Chemical Co., Inc.) and the amount of V-65B was changed to 0.085 g.

Synthesis Example 9

A polymer 9 was obtained in the same way as in Synthesis Example 2 except that the acrylic acid was changed to 20 g of itaconic acid (manufactured by Wako Pure Chemical Industries, Ltd.), the amount of the methyl methacrylate was changed to 30 g, the amount of V-65B was changed to 0.28 g, and the solvent was changed to 190 g of dimethylformamide. The obtained polymer had a weight average molecular weight Mw of 29,000, and a glass transition temperature of 125° C. The content of the itaconic acid unit in the polymer was 42% by mass.

Synthesis Example 10

In a 500-mL glass reactor equipped with two dropping funnels, a cooling tube, a thermometer, and a stirring blade, 116.7 g of 2-butanone (manufactured by Wako Pure Chemical Industries, Ltd.) and 20 g of maleic anhydride (manufactured by Wako Pure Chemical Industries, Ltd.) were charged to dissolve the maleic anhydride. Nitrogen bubbling was performed for 30 minutes, and the temperature was increased to 75° C. Then, an initiator solution obtained by dissolving 30 g of methyl methacrylate and 0.63 g of V-65B in 36.7 g of 2-butanone was dropped over 120 minutes. The mixture was kept at 75° C., and polymerization was performed for 3 hours. After the polymerization was completed, the solvent was removed from the mixture by evaporation, and the precipitate was redissolved in acetone. To the acetone solution, 22 g of ion exchange water was added, and the temperature was increased to 65° C. to perform hydrolysis of the maleic anhydride unit. The solution after completion of the reaction was dropped in 2 L of ion exchange water to perform purification by reprecipitation. The precipitated polymer was recovered and dried in a vacuum dryer at 60° C. overnight to obtain a polymer 10. The peaks of carboxylic acid were confirmed from proton NMR, and the existence of the maleic acid unit was confirmed.

Synthesis Example 11

A polymer 11 was obtained in the same way as in Synthesis Example 1 except that the amount of the acrylic acid was changed to 50 g, the amount of the methyl methacrylate was changed to 450 g, and the amount of V-65B was changed to 6.68 g.

Synthesis Example 12

A polymer 12 was obtained in the same way as in Synthesis Example 1 except that the amount of the acrylic acid was changed to 100 g, the amount of the methyl methacrylate was changed to 400 g, and the amount of V-65B was changed to 6.90 g.

Synthesis Example 13

A polymer 13 was obtained in the same way as in Synthesis Example 1 except that the acrylic acid was changed to methacrylic acid (manufactured by Kanto Chemical Co., Ltd.) and the amount of V-65B was changed to 0.083 g.

Synthesis Example 14

A polymer 14 was obtained in the same way as in Synthesis Example 9 except that the methyl methacrylate was changed to 30 g of butyl methacrylate.

Synthesis Example 15

A polymer 15 was obtained in the same way as in Synthesis Example 10 except that the methyl methacrylate was changed to 30 g butyl methacrylate.

Synthesis Example 16

A polymer 16 was obtained in the same way as in Synthesis Example 8 except that the α-methylene-γ-valerolactone was changed to 2-Ethylhexyl Methacrylate (manufactured by Wako Pure Chemical Industries, Ltd.).

Synthesis Example 17

A polymer 17 was obtained in the same way as in Synthesis Example 9 except that the amount of the itaconic acid was changed to 20 g, methyl methacrylate was changed to 30 g of ethyl methacrylate, and the amount of the initiator was changed to 0.26 g.

Synthesis Example 18

A polymer 18 was obtained in the same way as in Synthesis Example 2 except that the amount of the acrylic acid was changed to 6.25 g, the amount of the methyl methacrylate was changed to 18.75 g, and the amount of V-65B was changed to 0.085 g.

Synthesis Example 19

A polymer 19 was obtained in the same way as in Synthesis Example 2 except that the amount of the acrylic acid was changed to 11.25 g, the amount of the methyl methacrylate was changed to 13.75 g, and the amount of V-65B was changed to 0.091 g.

Synthesis Example 20

A polymer 20 was obtained in the same way as in Synthesis Example 1 except that the amount of the V-65B was changed to 1.43 g.

Synthesis Example 21

A polymer 21 was obtained in the same way as in Synthesis Example 20 except that the polymerization temperature was changed to 70° C.

The weight average molecular weight, the glass transition temperature, and the rate (mass rate) of each of the hydrophilic monomer units and the hydrophobic monomer units in the copolymer for each of the polymers 1 to 21 obtained in Synthesis Examples 1 to 21 are summarized in Table 1.

TABLE 1

| | | Composition of Copolymer | | | | | |
| | | Hydrophilic Monomer Unit | | Hydrophobic Monomer Unit | | | |
| | Type of Polymer | Type of Monomer Unit | Rate (% by mass) in Copolymer | Type of Monomer Unit | Rate (% by mass) in Copolymer | Weight Average Molecular Weight | Tg (° C.) |
| --- | --- | --- | --- | --- | --- | --- | --- |
| Synthesis Example 1 | Polymer 1 | AA | 37 | MMA | 63 | 105000 | 115 |
| Synthesis Example 2 | Polymer 2 | AA | 24 | MMA | 76 | 113000 | 115 |
| Synthesis Example 3 | Polymer 3 | AA | 45 | MMA | 55 | 83000 | 119 |

TABLE 1-continued

| | | Composition of Copolymer | | | | | |
|---|---|---|---|---|---|---|---|
| | | Hydrophilic Monomer Unit | | Hydrophobic Monomer Unit | | | |
| | Type of Polymer | Type of Monomer Unit | Rate (% by mass) in Copolymer | Type of Monomer Unit | Rate (% by mass) in Copolymer | Weight Average Molecular Weight | Tg (° C.) |
| Synthesis Example 4 | Polymer 4 | AA | 48 | MMA | 52 | 62000 | 120 |
| Synthesis Example 5 | Polymer 5 | AA | 31 | EMA | 69 | 91600 | 96 |
| Synthesis Example 6 | Polymer 6 | AA | 30 | BMA | 70 | 117000 | 73 |
| Synthesis Example 7 | Polymer 7 | AA | 35 | St | 65 | 84000 | 144 |
| Synthesis Example 8 | Polymer 8 | AA | 27 | MVL | 73 | 23000 | 180 |
| Synthesis Example 9 | Polymer 9 | IcA | 42 | MMA | 58 | 29000 | 125 |
| Synthesis Example 10 | Polymer 10 | MA | 37 | MMA | 63 | 24000 | 121 |
| Synthesis Example 11 | Polymer 11 | AA | 9 | MMA | 91 | 24200 | 104 |
| Synthesis Example 12 | Polymer 12 | AA | 16 | MMA | 84 | 51000 | 112 |
| Synthesis Example 13 | Polymer 13 | MAA | 35 | MMA | 65 | 75000 | 159 |
| Synthesis Example 14 | Polymer 14 | IcA | 50 | BMA | 50 | 28000 | 59 |
| Synthesis Example 15 | Polymer 15 | MA | 44 | BMA | 56 | 30400 | 61 |
| Synthesis Example 16 | Polymer 16 | AA | 23 | 2EHMA | 77 | 325000 | 52 |
| Synthesis Example 17 | Polymer 17 | IcA | 29 | EMA | 71 | 27900 | 80 |
| Synthesis Example 18 | Polymer 18 | AA | 17 | MMA | 83 | 121000 | 118 |
| Synthesis Example 19 | Polymer 19 | AA | 32 | MMA | 68 | 122000 | 118 |
| Synthesis Example 20 | Polymer 20 | AA | 43 | MMA | 57 | 369000 | 121 |
| Synthesis Example 21 | Polymer 21 | AA | 40 | MMA | 60 | 193000 | 119 |

* In Table 1, AA means an acrylic acid monomer unit, IcA means an itaconic acid monomer unit, MA means a maleic acid monomer unit, MAA means a methacrylic acid monomer unit, MMA means a methyl methacrylate monomer unit, EMA means an ethyl methacrylate monomer unit, BMA means an n-butyl methacrylate monomer unit, 2EHMA means a 2-ethylhexyl methacrylate monomer unit, St means a styrene monomer unit, and MVL means an α-methylene-γ-valerolactone monomer unit.

Synthesis Example 22

The polymers 1 and 12 (polymer 1/polymer 12=80% by mass/20% by mass) were dissolved in an acetone/ethanol solvent and mixed. The mixture was dried and ground to obtain a polymer 22. The obtained polymer 22 had a weight average molecular weight of 94,200, and a glass transition temperature of 114° C. The content of the acrylic acid unit in the polymer was 33% by mass, and the content of the methacrylate unit in the polymer was 67% by mass.

Examples and Comparative Examples

Examples 1 to 15 and Comparative Examples 1 to 7

The solubility of each of the polymers 1 to 20 and 22 obtained in the synthesis examples in an alkaline aqueous solution was evaluated by the following method. The method of adjusting a sample of a commercial product (Comparative Example 6) is as follows.

Comparative Example 6

Structural analysis was performed on a filament of Soluble Support Material P400SR (registered trademark) manufactured by Stratasys, Ltd. by proton NMR (solvent=dimethylsulfoxide-d6). The structure of the filament was a copolymer having a ratio of methacrylic acid/methyl methacrylate of 55% by mass/45% by mass and a Mw of 130,000. Triphenyl phosphate or the like was mixed as a plasticizer, and the glass transition temperature was 100° C. This P400SR was ground with a coffee mill to evaluate its dissolution rate in an alkaline aqueous solution.

<Evaluation Method>

[Dissolution Rate]

The polymer was ground with a coffee mill (Mini Blender manufactured by Osaka Chemical Co., Ltd.) (the grinding time was 60 seconds), 20 g of a 2.4% aqueous solution of a support material cleaning agent P400SC (manufactured by Stratasys, Ltd.) was added for every 1.0 g of the ground polymer, and the mixture was irradiated with ultrasonic waves for 5 minutes at room temperature by using an ultrasonic cleaning machine. The polymer remaining undissolved was filtered, cleaned with ion exchange water, and dried. The weight of the polymer remaining undissolved was measured, and the dissolution rate was calculated by using the following formula.

Dissolution rate (%)=((Weight of polymer before dissolution−Weight of polymer remaining undissolved)/Weight of polymer before dissolution)×100

Dissolution Rate after Polymer was Formed into Filament

Example 16

The polymer 1 was formed into a filament having a diameter of 1.5 mm at a melting temperature of 195° C. and an extruding rate of 75 mm/min by using a capillary rheometer (Capilograph 1D manufactured by Toyo Seiki Seisaku-sho, Ltd.). The dissolution rate of this filament was similarly measured, and was 94%.

Comparative Example 8

The dissolution rate of the commercially available filament-formed support material evaluated in Comparative Example 6 was similarly measured without the support material being ground, and was 3%.

Dissolution Rate of Elastomer-Containing Support Material

Example 17

(Production Example of Elastomer)
In a 2-L 4-neck flask equipped with a reflux pipe, 19.76 g of diethyl sulfate (manufactured by Wako Pure Chemical Industries, Ltd.) and 84.39 g of 2-ethyl-2-oxazoline (manufactured by PCI, Inc.) were dissolved in 211.46 g of dehydrated ethyl acetate (manufactured by Wako Pure Chemical Industries, Ltd.), and the mixture was heated to reflux under a nitrogen atmosphere for 8 hours to synthesize a terminal reactive poly(N-propionylethylenimine) (polyoxazoline). The GPC method was performed under the following conditions to produce a calibration curve from standard polystyrene, and the weight average molecular weight (Mw) was determined to be 1,050. A 33% ethyl acetate solution of 307.50 g of side chain primary aminopropyl modified polydimethylsiloxane (KF-8003, manufactured by Shin-Etsu Chemical Co., Ltd.) was added to this polymer at once, and the mixture was heated to reflux for 10 hours. The reaction mixture was compressed and concentrated to obtain an N-propionylethylenimine-dimethylsiloxane copolymer as a pale yellow rubbery semi-solid (elastomer). The content rate of an organopolysiloxane segment as the final product was determined by $^1$H NMR measurement, and was 76% by mass. As a result of neutralization titration by hydrochloric acid using methanol as a solvent, it was found that 20% by mass of the amino group remained.

(Conditions for Measuring Molecular Weight of Poly(N-Propionylethylenimine))
Machine: HLC-8320 GPC (Tosoh Corporation, detector integrated type)
Column: K804L+K804L (manufactured by Showa Denko K.K.)
Eluent: 1 mmol/L FARMIN DM20 (manufactured by Kao Corporation)/Chloroform
Flow rate: 1.0 mL/min
Column temperature: 40° C.
Detector: RI
Sample amount: 5 mg/mL, 100 μL
Standard: Polystyrene (Dissolution Rate)
In 10 parts by mass of acetone/ethanol, 50 parts by mass of the polymer 1, 50 parts by mass of the polymer 21, 15 parts by mass of an N-propionylethylenimine-dimethylsiloxane copolymer and 10 parts by mass of DAIFATTY-101 were dissolved, mixed, and compressed and dried at 60° C. to obtain an elastomer-containing support material. The dissolution rate of this elastomer-containing support material was similarly measured, and was 96%.

The evaluation results are shown in Table 2.

TABLE 2

| | Type of Polymer, etc. | Evaluation Results Dissolution Rate (%) Powder Method, 5 Minutes |
|---|---|---|
| Example 1 | Polymer 1 | 96 |
| Example 2 | Polymer 2 | 90 |
| Example 3 | Polymer 3 | 96 |
| Example 4 | Polymer 4 | 96 |
| Example 5 | Polymer 5 | 99 |
| Example 6 | Polymer 6 | 96 |
| Example 7 | Polymer 7 | 97 |
| Example 8 | Polymer 8 | 86 |
| Example 9 | Polymer 9 | 100 |
| Example 10 | Polymer 10 | 99 |
| Example 11 | Polymer 16 | 96 |
| Example 12 | Polymer 17 | 87 |
| Example 13 | Polymer 22 | 91 |
| Example 14 | Polymer 19 | 95 |
| Example 15 | Polymer 20 | 80 |
| Comparative Example 1 | Polymer 11 | 9 |
| Comparative Example 2 | Polymer 12 | 27 |
| Comparative Example 3 | Polymer 13 | 65 |
| Comparative Example 4 | Polymer 14 | 8 |
| Comparative Example 5 | Polymer 15 | 23 |
| Comparative Example 6 | Commercial Product (P400SR) | 13 |
| Comparative Example 7 | Polymer 18 | 13 |
| Example 16 | Polymer 1 | 94[1] |
| Comparative Example 8 | Commercial Product (P400SR) | 3[1] |
| Example 17 | Elastomer-Containing Soluble Material for Three-Dimensional Modeling | 96 |

[1]Dissolution rate after the sample was formed into a filament.

Solubility Evaluation with Different Cleaning Agents

Example 18 and Comparative Examples 9 to 11

The dissolution rate of each of the polymer 1 and the commercial product was evaluated in the same way as the method of measuring the dissolution rate except for the conditions described in Table 3. The type and form of the evaluated polymer and the type of the cleaning agent were as follows.

(Type of Polymer)
Polymer 1: Polymer synthesized in Synthesis Example 1
Commercial product: P400SR (Form of Polymer)
Powder: Polymer ground for 60 seconds with a coffee mill in the same way as in Comparative Example 6 [Dissolution rate]

Filament: Filament having a diameter of 1.5 mm cut into a piece of about 5 mm long
(Type of Cleaning Agent)
P400SC: Cleaning agent for the support material (manufactured by Stratasys, Ltd.)
Magiclean: Magiclean (manufactured by Kao Corporation, Lot. No W852350, ingredient: water, alkyl glyceryl ether, ethanolamine, alkyl glycoside, fragrance, colorant)
A raw liquid of Magiclean was used without dilution.
The evaluation results are shown in Table 3.

TABLE 3

| | Type of Polymer | Form | Type of Cleaning Agent | pH | Irradiation Time (minute) of Ultrasonic Waves | Evaluation Results Dissolution Rate (%) |
|---|---|---|---|---|---|---|
| Example 18 | Polymer 1 | Filament | Magiclean | 11.8 | 10 | 100 |
| Comparative Example 9 | Commercial Product (P400SR) | Powder | Magiclean | 11.8 | 10 | 38 |
| Comparative Example 10 | Commercial Product (P400SR) | Filament | P400SC | 12.7 | 360 | 52 |
| Comparative Example 11 | Commercial Product (P400SR) | Filament | Magiclean | 11.8 | 360 | 96 |

Reference Examples 1 to 4

[Damage on Modeling Material by Various Cleaning Agents]

A filament (diameter 1.7 mm) of ABS-P400 (registered trademark) MODEL (WHITE) (manufactured by Stratasys, Ltd.: ABS resin) was cut into pieces each having a length of 5 cm as a modeling material. The pieces of filament (5 pieces, about 0.65 g) were charged in a 30-mL screw vial (manufactured by Maruemu Corporation, No. 6), 30 g of the cleaning agent shown in Table 4 was added, the vial was closed with a screw cap, and the closed vial was irradiated with ultrasonic waves at room temperature for 5 minutes to 360 minutes in an ultrasonic cleaning machine. After the closed vial was irradiated with ultrasonic waves for the prescribed time shown in Table 4, these pieces of filament were taken out. The moisture on each piece was wiped off with a paper towel, the center of the piece of filament was held by hand and bent back and forth at 90° repeatedly at a cycle of one bend per second to break the piece of filament. The number of bends until the piece of filament was broken was measured. A number of bends until breakage in the bending test was obtained as the average value of the numbers of bends until these 5 pieces of filament were broken. A smaller number of bends until breakage in the bending test means larger damage on the filament. The number of bends until breakage in the bending test of the modeling material that was not treated with the cleaning agent was 36 times. In this test, P400SC was a 2.4% aqueous solution, and Magiclean was used in the form of a raw liquid without dilution. The evaluation results are shown in Table 4.

TABLE 4

| | Model Material | Type of Cleaning Agent | pH | Irradiation Time (minute) of Ultrasonic Waves | Bending Test Number of Bends until Breakage (times) |
|---|---|---|---|---|---|
| Reference Example 1 | ABS | Magiclean | 11.8 | 10 | 36 |
| Reference Example 2 | ABS | Magiclean | 11.8 | 360 | 27 |
| Reference Example 3 | ABS | P400SC | 12.7 | 5 | 38 |
| Reference Example 4 | ABS | P400SC | 12.7 | 360 | 15 |

* In Table 4, ABS means ABS-P400 MODEL (WHITE) (manufactured by Stratasys, Ltd.).

Modeling Properties by 3D Printer

Example 19

A filament of the polymer 6 formed in the same way as in Example 15 was supplied to Atom 3D Printer manufactured by Genkei LLC, and the filament was extruded from a heat nozzle having a temperature of 230° C. to perform modeling. The extruded polymer 1 was made into a support having a width of about 0.4 mm and a height of about 0.25 mm (slice interval), and a modeled object was produced from an ABS resin having a glass transition temperature of 104° C. so that the modeled object was formed on the support. The modeled object was laminated on the support, and the modeled object (ABS thermoplastic resin) maintained its shape on the support (polymer 1) without coming off.

Composition of Plasticizer

Examples 20 to 25

Melt kneading was performed by using DAIFATTY-101 (methyl diglycol adipate/benzyl alcohol 1:1 mixed ester, manufactured by Daihachi Chemical Industry Co., Ltd., sp value 10.0) and ECOLA A1010 (methyl triglycol diester succinate, manufactured by Kao Corporation, sp value 9.57) as the plasticizers, 100 g of the polymer 1 (sp value 10.3) obtained in Synthesis Example 1, and a melt kneader (Labo Plastmill 4C150 manufactured by Toyo Seiki Seisaku-sho, Ltd.) for 10 minutes in the conditions of 190° C. and 90 r/min. After kneading, the kneaded product was press-formed into a film (thickness 0.4 mm) at 190° C. by using a pressing machine (Labo Press P2-30T manufactured by Toyo Seiki Seisaku-sho, Ltd.), and compatibility between the polymer and the plasticizer and bleedout of the plasticizer were determined visually. The case where the film was transparent was determined compatible, and the case where the film was cloudy was determined incompatible. The bleedout of the plasticizer was determined by whether or not the surface of the film was wet. The amount of the plasticizer compounded and the evaluation result are shown in Table 5. A transparent resin was obtained and bleedout of the plasticizer was not confirmed in any addition of the plasticizers.

TABLE 5

| | Polymer | | Plasticizer | | Evaluation Results | |
|---|---|---|---|---|---|---|
| | Type of Polymer | Amount (% by mass) | Type of Plasticizer | Amount (% by mass) | Compatibility with Resin | Bleedout |
| Example 20 | Polymer 1 | 95 | DAIFATTY-101 sp value = 10 | 5 | Compatible | None |
| Example 21 | Polymer 1 | 91 | DAIFATTY-101 sp value = 10 | 9 | Compatible | None |
| Example 22 | Polymer 1 | 83 | DAIFATTY-101 sp value = 10 | 17 | Compatible | None |
| Example 23 | Polymer 1 | 95 | ECOLA A1010 sp value = 9.57 | 5 | Compatible | None |
| Example 24 | Polymer 1 | 91 | ECOLA A1010 sp value = 9.57 | 9 | Compatible | None |
| Example 25 | Polymer 1 | 83 | ECOLA A1010 sp value = 9.57 | 17 | Compatible | None |

The invention claimed is:

1. A soluble material for three-dimensional modeling that is used as a material of a support material that supports a three-dimensional object when manufacturing the three-dimensional object with a fused deposition modeling type 3D printer, said soluble material for three-dimensional modeling comprising at least one copolymer selected from the group consisting of (I) to (III):

(I) a copolymer having at least one monomer unit selected from the group consisting of a hydrophilic monomer unit represented by the Formula (1) and hydrophobic monomer units represented by the Formulae (4) to (6), and having a content of the hydrophilic monomer unit of 20% by mass to 80% by mass;

(II) a copolymer having at least one monomer unit selected from the group consisting of a hydrophilic monomer unit represented by the Formula (2) and a hydrophobic monomer unit represented by the Formula (7), and having a content of the hydrophilic monomer unit of 20% by mass to 80% by mass; and (III) a copolymer having a hydrophilic monomer unit represented by the Formula (3) and a hydrophobic monomer unit represented by the Formula (8), and having a content of the hydrophilic monomer unit of 20% by mass to 80% by mass:

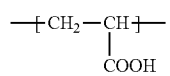
(1)

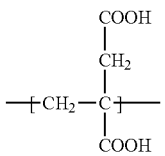
(2)

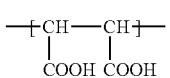
(3)

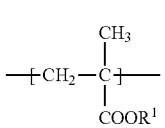
(4)

wherein $R^1$ represents a straight chain alkyl group or a branched alkyl group each having 1 to 8 carbon atoms;

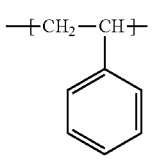
(5)

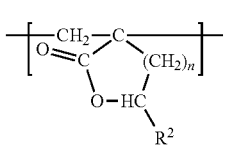
(6)

wherein n represents an integer of 1 to 3, and $R^2$ represents a hydrogen atom or a methyl group;

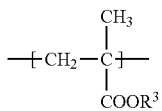

(7)

wherein $R^3$ represents an alkyl group having 1 or 2 carbon atoms;

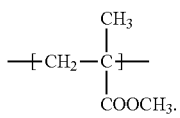

(8)

wherein each of the copolymers (I), (II), and (III) has a weight average molecular weight of 70,000 or more and 350,000 or less;

wherein the soluble material for three-dimensional modeling also contains a polymer in addition to the at least one copolymer selected from the group consisting of (I) to (III), and the polymer in addition to the at least one copolymer selected from the group consisting of (I) to (III) is at least one copolymer selected from the group consisting of (i) to (iii):

(i) at least one elastomer selected from the group consisting of polyetherester and polyetheresteramide each consisting of hard segments and soft segments;

(ii) at least one hydrophilic thermoplastic elastomer selected from the group consisting of a graft polymer formed of a hydrophobic rubber grafted with a polymer having a hydrophilic group, a graft polymer formed of silicone grafted with polyoxazoline, and an ionic elastomer; and (iii) at least one water insoluble polymer selected from the group consisting of at least one thermoplastic elastomer selected from the group consisting of a styrene-butadiene copolymer and a polymethylmethacrylate-polybutylacrylate-polymethylmethacrylate block copolymer.

2. The soluble material for three-dimensional modeling according to claim 1, wherein the content of the hydrophilic monomer unit represented by the Formula (1) in the copolymer (I) is 30% by mass or more and 60% by mass or less.

3. The soluble material for three-dimensional modeling according to claim 1, wherein each of the copolymers (I), (II), and (III) has a glass transition temperature of 60° C. or higher.

4. The soluble material for three-dimensional modeling according to claim 1, wherein each of the copolymers (I), (II), and (III) has a glass transition temperature of 75° C. or higher.

5. The soluble material for three-dimensional modeling according to claim 1, wherein each of the copolymers (I), (II), and (III) has a glass transition temperature of 160° C. or lower.

6. The soluble material for three-dimensional modeling according to claim 1, wherein each of the copolymers (I), (II), and (III) has a glass transition temperature of 140° C. or lower.

7. The soluble material for three-dimensional modeling according to claim 1, further comprising a plasticizer.

8. The soluble material for three-dimensional modeling according to claim 1, wherein the plasticizer has an sp value of 8 to 13.

9. The soluble material for three-dimensional modeling according to claim 7, wherein the plasticizer is at least one member selected from the group consisting of a polyester-based plasticizer, a polyhydric alcohol ester-based plasticizer, a polycarboxylic acid ester-based plasticizer, and a phosphoric acid ester-based plasticizer.

10. The soluble material for three-dimensional modeling according to claim 1, having a filament form.

11. The soluble material for three-dimensional modeling according to claim 10, wherein the filament has a diameter of 0.5 mm to 3.0 mm.

12. The soluble material for three-dimensional modeling according to claim 1, wherein copolymer (ii) is a hydrophobic rubber grafted with a polymer having a hydrophilic group which is polyacrylic acid.

13. The soluble material for three-dimensional modeling according to claim 1, wherein in the formula (4), $R^1$ is at least one member selected from the group consisting of a methyl group, an ethyl group, an n-propyl group, an i-propyl group, an n-butyl group, an i-butyl group, a t-butyl group, and a 2-ethylhexyl group.

14. The soluble material for three-dimensional modeling according to claim 1, wherein the total content of at least one member selected from the group consisting of the hydrophobic monomer units represented by the formulae (4) and (6) in the copolymer (I) is 45% by mass to 70% by mass.

* * * * *